UNITED STATES PATENT OFFICE.

JOHN L. BRABYN, OF NEW YORK, N. Y.

IMPROVEMENT IN FURNITURE-POLISH.

Specification forming part of Letters Patent No. 15,550, dated August 19, 1856.

*To all whom it may concern:*

Be it known that I, JOHN L. BRABYN, of the State, city, and county of New York, have invented a new and useful composition of matter named "Brother Jonathan's Champion Furniture-Polish," to polish painted or unpainted wood, oil-cloth, and patent-leather; and I do hereby declare that the following is a full, clear, and exact description of the said composition and of its application.

The nature of my invention consists in forming a new and useful composition of matter with such ingredients and in such proportions as will produce a durable polish, admitting of rapid application and desiccation, and capable of resisting the action of hot or cold water.

To enable others skilled in the art to make and use my invention, I will proceed to describe its formation and application.

I put three pounds of gum-orange shellac, one-quarter of a pound of gum-sandarac, and two gallons of alcohol together in one vessel, and leave it there until the two kinds of gum are dissolved. I then put four gallons of linseed-oil, one quart of alcohol, six pints of distilled vinegar, three pints of camphene, (or burning-fluid or spirits of turpentine,) and one pint of chlorhydric acid (commonly called muriatic acid) together in another vessel and mix them thoroughly together. I then join the contents of these two vessels into a third vessel, confining it there during ten hours, and agitate the mixture occasionally during that time. I then strain it through a fine sieve, and stir it thoroughly before and during the time of bottling. When bottled and corked the composition is ready for use.

This polish is applied in the following manner: It is thoroughly shaken in the bottle, poured on canton flannel or on any other soft rag, and rubbed on wood, oil-cloth, or patent-leather during about ten seconds. By this time the surface becomes thoroughly dry and forms a durable new body of polish on the surface, which is capable of resisting the action of hot or cold water.

What I claim as new, and desire to secure by Letters Patent of the United States, is—

The combination of muriatic and acetic acid with the usual ingredients of furniture-polish, in the proportions and manner substantially as specified, for the purpose of producing a polish capable of resisting the action of hot or cold water.

JOHN L. BRABYN.

Witnesses:
CHS. WEHLE,
SAML. HERBERT.